(12) United States Patent
Mihalik et al.

(10) Patent No.: US 9,367,823 B1
(45) Date of Patent: Jun. 14, 2016

(54) COMPUTER METHOD AND SYSTEM FOR RANKING USERS IN A NETWORK COMMUNITY OF USERS

(75) Inventors: John L. Mihalik, Pittsburgh, PA (US);
Thomas A. Gerace, Boston, MA (US);
David A. Sandborg, Pittsburgh, PA (US); Helen Feder, Pittsburgh, PA (US);
Richard A. Meyer, Pittsburgh, PA (US)

(73) Assignee: Skyword, Inc., Boston, MA (US)

(*) Notice: Subject to any disclaimer, the term of this patent is extended or adjusted under 35 U.S.C. 154(b) by 986 days.

(21) Appl. No.: 12/266,893

(22) Filed: Nov. 7, 2008

Related U.S. Application Data

(60) Provisional application No. 60/986,796, filed on Nov. 9, 2007.

(51) Int. Cl.
| G06Q 10/00 | (2012.01) |
| G06Q 10/06 | (2012.01) |
| G06Q 30/02 | (2012.01) |
| G06Q 50/00 | (2012.01) |
| G06F 17/30 | (2006.01) |

(52) U.S. Cl.
CPC ............ *G06Q 10/06* (2013.01); *G06F 17/3053* (2013.01); *G06Q 30/02* (2013.01); *G06Q 30/0269* (2013.01); *G06Q 50/01* (2013.01)

(58) Field of Classification Search
CPC ... G06Q 10/06; G06Q 30/0269; G06Q 50/01; G06Q 30/02; G06F 17/3053
USPC ........................ 705/7.11, 14.66, 319; 707/748
See application file for complete search history.

(56) References Cited

U.S. PATENT DOCUMENTS

| 6,285,999 | B1 | 9/2001 | Page | |
| 2005/0159998 | A1* | 7/2005 | Buyukkokten | G06Q 50/01 705/319 |
| 2006/0042483 | A1* | 3/2006 | Work | G06Q 10/00 101/91 |
| 2006/0200434 | A1* | 9/2006 | Flinn | G06N 99/005 706/12 |
| 2007/0112761 | A1* | 5/2007 | Xu | G06F 17/30616 |

(Continued)

OTHER PUBLICATIONS

Egan, R., "The Secrets of Real-Time Search Success," *iMedia Connection* [online], Feb. 9, 2010, [retrieved on Feb. 10, 2010]. Retrieved from the Internet URL: http://www.imediaconnection.com/printpage/printpage.aspx?id=25877.

(Continued)

*Primary Examiner* — Timothy Padot
(74) *Attorney, Agent, or Firm* — Hamilton, Brook, Smith & Reynolds, P.C.

(57) ABSTRACT

A computer method and system for ranking computer network portal users is provided. The system and method comprise a ranking module which determines rank of an individual in a community of global computer network users. The ranking module determines rank of an individual as a function of user demand. The function of user demand includes any one or combination of number of requests to be connected to the individual user, readership following of the individual user and keywords common between profiles or authored works by the individual user and those of other users. An output member is coupled to receive the determined rank from the ranking module and generates an ordered list of user names ordered by determined rank of individuals. The rank of individuals may be provided to external entities such as fraud detection systems or advertising targeting engines.

48 Claims, 4 Drawing Sheets

(56) References Cited

U.S. PATENT DOCUMENTS

| | | | | |
|---|---|---|---|---|
| 2007/0198510 A1* | 8/2007 | Ebanks | | G06Q 30/02 |
| 2007/0208613 A1* | 9/2007 | Backer | | G06Q 10/107 |
| | | | | 715/234 |
| 2007/0256093 A1* | 11/2007 | Hiler | | G06F 17/3089 |
| | | | | 725/28 |
| 2007/0260725 A1* | 11/2007 | McCuller | | G06Q 30/02 |
| | | | | 709/224 |
| 2008/0077461 A1* | 3/2008 | Glick | | G06Q 10/06 |
| | | | | 705/7.29 |
| 2008/0077517 A1* | 3/2008 | Sappington | | G06Q 10/04 |
| | | | | 705/35 |
| 2008/0109491 A1* | 5/2008 | Gupta | | G06Q 10/10 |
| 2008/0133657 A1* | 6/2008 | Pennington | | G06Q 30/02 |
| | | | | 709/204 |
| 2008/0162260 A1 | 7/2008 | Rohan et al. | | |

OTHER PUBLICATIONS

Shankland, Stephen "Microsoft Tries to One-Up Google PageRank" http://news.cnet.com/8301.1023_3-9999038-93.html, Oct. 20, 2008.

* cited by examiner

COMPUTER METHOD AND SYSTEM FOR RANKING USERS IN A NETWORK COMMUNITY OF USERS

RELATED APPLICATION

This application claims the benefit of U.S. Provisional Application No. 60/986,796, filed on Nov. 9, 2007. The entire teachings of the above application(s) are incorporated herein by reference.

BACKGROUND OF THE INVENTION

A global computer network, such as the Internet, is generally formed of a plurality of computer networks, servers and end user computers interconnected across communication lines. The computer networks are loosely coupled for communication to each other to enable access from one digital processor of one network to a digital processor of another network in the plurality of computer networks. The servers provide to end user computers access to the computer networks and to the various digital processors in the plurality of networks in the global computer network.

Publishing and viewing information on the global computer network typically requires two software components. Electronic publishers run, for example, Hyper Text Transfer Protocol (HTTP) server software, while users scanning or searching on the global computer network run browser software. In the example of the Internet, the World Wide Web (Web) is the protocol used to create and publish documents. Web pages display information, point to other Websites or provide a user-interactive application (generally referred to as a web portal). Some Websites and Web portals provide commerce, e.g., retail sales, secondary market transactions (E-Bay), or other trading, while other Websites serve governmental, philanthropic, social, or other purposes.

There is a growing number of so-called "social networks" on a global computer network. There is a growing acceptance and use of the same. Examples are GATHER®, MYSPACE, FACEBOOK, FRIENDSTER, and others.

In order for an end user to take advantage of this wealth of information and activity offered by a global computer network (the Internet), one needs improved tools or systems for searching and navigating the large pools of databases and electronic media of such a network. Improvements in ranking search results, profiling features, and ordering recommendations are also needed.

SUMMARY OF THE INVENTION

Embodiments of the present invention address the disadvantages of the prior art. In particular, an embodiment of the present invention provides a computer-based method and system for ranking an individual user among a network community of users. Said another way, an embodiment of the present invention determines the social importance of a user (or demand for the user) relative to the network community of users. This social importance is measured based on demand of others to be connected to a subject user, levels of activity (subject user interaction) within the network community portal, and/or readership following of the subject user in the network community. Other metrics such as popularity, social activity-type factors, and the like are also suitable.

In a preferred embodiment, the invention method and system identifies importance of an individual user, in a community of global computer network users, as a function of user demand. The invention method/system next determines ranking of the individual based on the identified importance. In a preferred embodiment, this ranking determination is recursive using rankings of people connecting to the individual.

In some embodiments, the ranking enables earlier computerized discovery of online information based on the browsing activities of highly ranked individuals (experts). Experts may be identified to do any one or more of creating content, commenting on proposals, participating in discussion, and reviewing publications; where the identifying is based on any one or more of user rank, profile characteristics, and areas of interest. Experts may also be identified in a specific location.

An output component provides an indication of the determined ranking of the importance of the subject individual. The ranking may be visible as a number, a tier level demonstrating status, or both. In some embodiments, the determined ranking is provided to targeted advertising engines, fraud detection systems, or external entities such as other social networks.

In one embodiment, the function of demand for an individual user includes any one or combination of the following:
 number of requests to be connected to the individual user;
 number of actual connections made to the individual user;
 number of messages (e.g., email, text messages, and the like) sent to the individual user;
 number of messages (e.g., email, text messages, and the like) sent by the individual user and opened by other users;
 number of public comments made on a profile of the individual user;
 number of requests to view content authored by the individual user;
 number of comments on the individual user's content;
 number of invitations sent to the individual user for any one or more of: i) membership to the community, ii) membership to groups, and ii) events;
 number of chat or instant message requests made to the individual user;
 number of chat or instant message sessions engaged in by the individual user;
 number of videoconference requests made to the individual user;
 number of videoconference sessions engaged in by the individual user;
 number of calls attempted to the individual user;
 number of calls received by the individual user;
 community members following activities of the individual user activity within the network (e.g., number of feed requests made by other users involving the individual user); and
 keywords common between any one or combination of a profile and content created by a user and any one or combination of a profile and content of the individual user.

The community members' following may be topic specific (by tag or keyword) resulting in different ranks for each user for different topical areas. The function of user demand may be weighted by user to yield a demand distribution for an individual user across other users.

An embodiment of the invention decreases the rank of users engaging in behavior that is prohibited or discouraged within the community. A watch list of such individuals and their connections enables system administrators to monitor and limit such activities. Another embodiment decreases the rank of individuals whose connection requests sent to other people are declined or ignored.

Search results for members or content may be sorted using user ranking as a factor. Members may opt not to see indications of users below a certain rank in their search results. In this context, "below a certain rank" may correspond to an absolute or a relative rank threshold. For example, users may wish not to view indications (e.g., name or profile information) of users that are below rank 1000 or that are ranked in the lowest quartile. Another way to find relevant information quickly is to track browsing activities of highly ranked users.

In some embodiments, content browsing information of or for users is collected; and search results for content are organized (prioritized) using a function of ranks of users browsing the content. In other embodiments, content or Internet pages recommended by (browsed by) users may be collected and organized (e.g., prioritized or ordered) using a function of ranks of users making the recommendations (browsing the content/pages). In this way, embodiments provide a method or system of assembling an improved web (global computer network) search database of various (wide spread) source content. User rank may also be used to identify candidates to receive a promotional sample or discount.

Users may gain or lose privileges depending on their rank. They may also be compensated for participation or publishing in the community based on rank.

New members are assigned a rank of users who invited them to join. New members who join without being invited are assigned a different initial rank than those who are invited.

An embodiment of the invention is an advertising targeting engine. Advertisements that will be displayed to a user may be chosen based on one or more of user rank, profile characteristics, areas of interest, and geographic location. An advertising pricing system prices advertisements based on the rank distribution of the target audience.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1A:
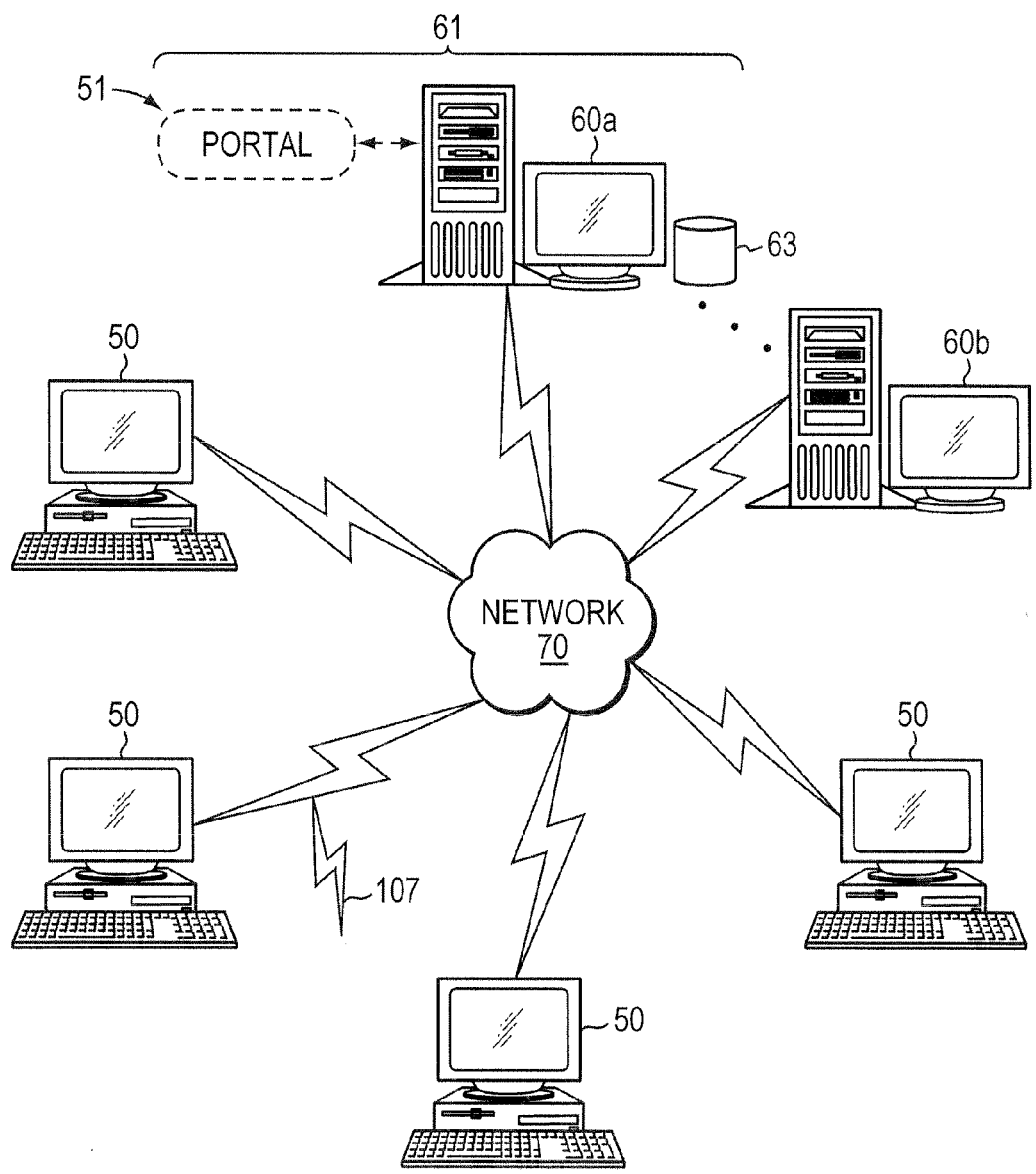
FIGS. 1a and 1b are schematic diagrams of a computer network and a block diagram of a computer node on the network, respectively, in which embodiments of the present invention are implemented.

A description of example embodiments of the invention follows.

Overview

PeopleRank of embodiments of the present invention is a system that quantitatively (e.g., mathematically) produces a measure of social status within large social networks of interconnected people (generally computer network communities of users). In most social networks of art, people connect to other people. People issue connection requests to other people they have found online with whom they wish to connect. This produces a directional link or directional connection from one person to another. The direction of the link is from the person requesting the connection to the person being connected to. This produces a large scale interconnected network or graph where the nodes in this network are people and the directional lines connecting people are connections.

PeopleRank takes into account not only the quantity of connect requests, but also who the person is that requested the connection. More precisely, the popularity of a person is proportional to the popularity of the people who have requested to be connected with that person. The popularity of the people wishing to be connected to that person is proportional to the popularity of the people that have requested connections to them, and so on. The term "popularity" is used below in the sense of importance (e.g., demand).

PeopleRank measures the importance of individuals in a social network as a function of demand for those individuals. In a preferred embodiment, this measure of importance is derived recursively for the entire interconnected graph of directed connections. The term "PeopleRank" may refer variously to the invention system for measuring importance, the score of the importance of a particular user, or the user ranking based thereon.

In this manner, receiving connection requests from highly important (in-demand) people is more valuable for one's importance ranking than receiving connection requests from people who are not important. In addition, receiving connection requests from lots of low-importance people is also beneficial for one's importance ranking.

Mathematical Description

PeopleRank uses the large interconnected graph of connections between people in a computer-based social network to determine a mathematical score for each individual in the network. It does this by mathematically taking into account the entire connected graph of people all at once. The connection graph may have numerous circular connections, dead ends, and isolated networks, all of which must be dealt with mathematically.

The connection graph is modeled as an edge-weighted directed graph. The edge weighted directed graph is a common mathematical problem that has long-standing computational methods such as power iterations and principal eigenvector computation in linear algebra.

Power Iteration

Applicants model the problem by defining a node adjacency matrix E of the directed connection graph. $E[i,j]=1$ if the person i has a directional connection to the person j and is zero otherwise. Each node in the connection graph has a popularity vector $p[v]$ associated with it which is represented as p.

Using this notation, applicants represent a new popularity vector p' which sums the popularity of linked nodes as a matrix equation:

$$p'=E^T p$$

This is also expressed as:

$$p'[v]=\Sigma_u E^T[u,v]p[u]$$

$$p'[v]=\Sigma_u E[v,u]p[u]$$

This gives a recursive equation which one can use a power iteration to solve. Start with a unary vector where $p=(1, 1, 1, 1 \ldots 1)^T$ and use an iterative assignment $p=E^T p$. Within each iteration, normalize the vector p to 1. After many iterations, the vector p converges to a value, which is known as the principal eigenvector of the matrix $E^T$.

PageRank

Applicants solve the problem of computing popularity using the following PageRank algorithm and power iterations. In this model, applicants use a "random walk" approach as outlined in PageRank and apply that to the connection graph of people.

Suppose a person were to browse randomly from person to person using the directed connection graph described above. At each person/node the browser randomly chooses to browse to one of the directed connections. Applicants model an adjacency matrix E of the directed connection graph as described above. E[u,v]=1 if the person u has a directional connection to the person v and is zero otherwise.

Given E, the out-degrees of node i is:

$$N_u = \sum_v E[u, v]$$

This is simply the count of the number of directed connections from node u.

Next normalize all row sums to 1:

$$L[u,v]=E[u,v]/N_u$$

The probability of getting to node v when one is present on node u is then:

$$p_1[v] = \sum_u L[u, v] p_0[u]$$

which can be written as:

$$p_1 = L^T p_0$$

This is the identical form of the equation described in the above section and can be solved using a power iteration.

Embodiments of the present invention iterate a sufficient number of iterations until the relative rank ordering of the vector p is attained. The popularity of node u is p[u], which is referred to herein as the PeopleRank.

PeopleRank Computational Example

Figure 1B:
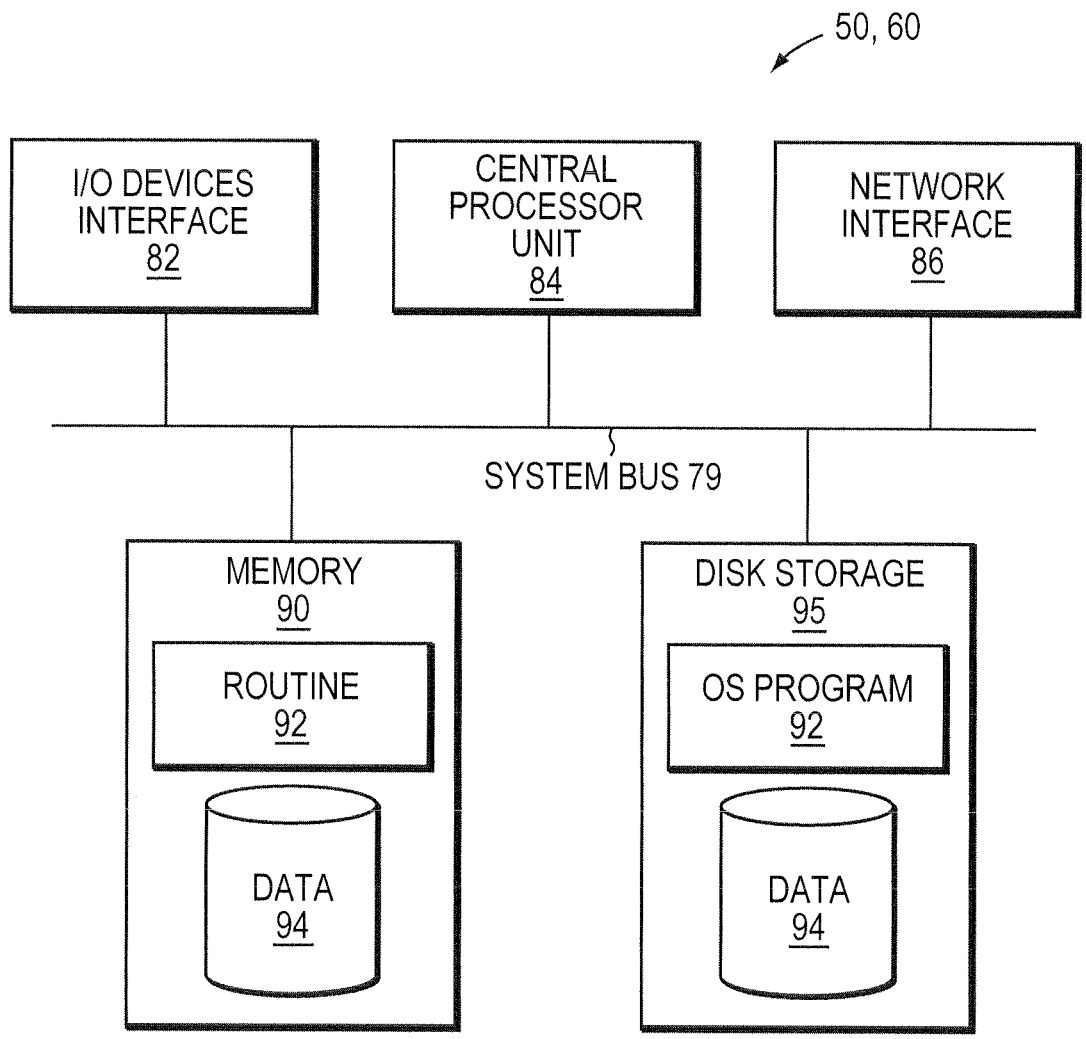
Figure 2:
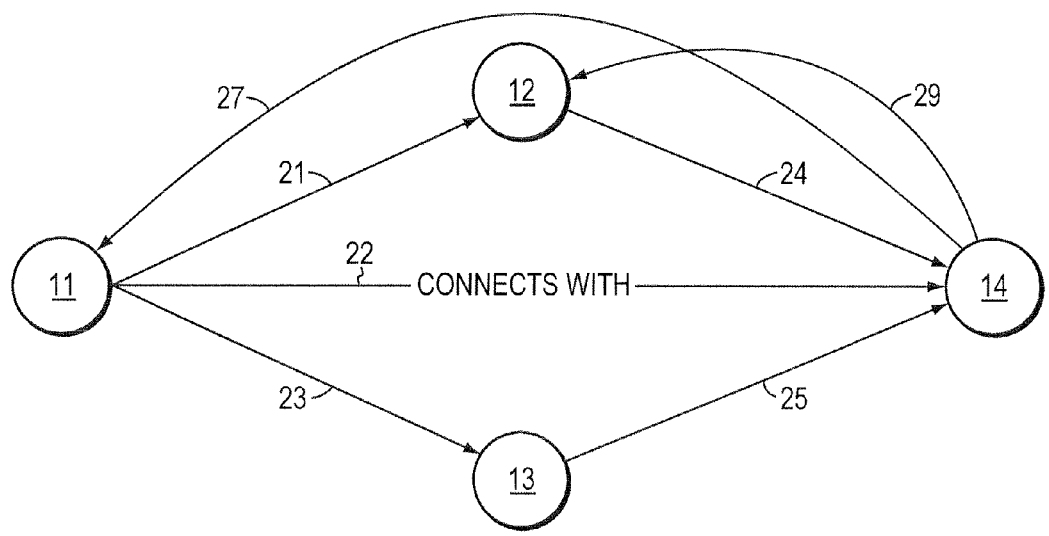
FIG. 2 is a schematic illustration of a connection graph representing people connections in a social network.
Figure 3:
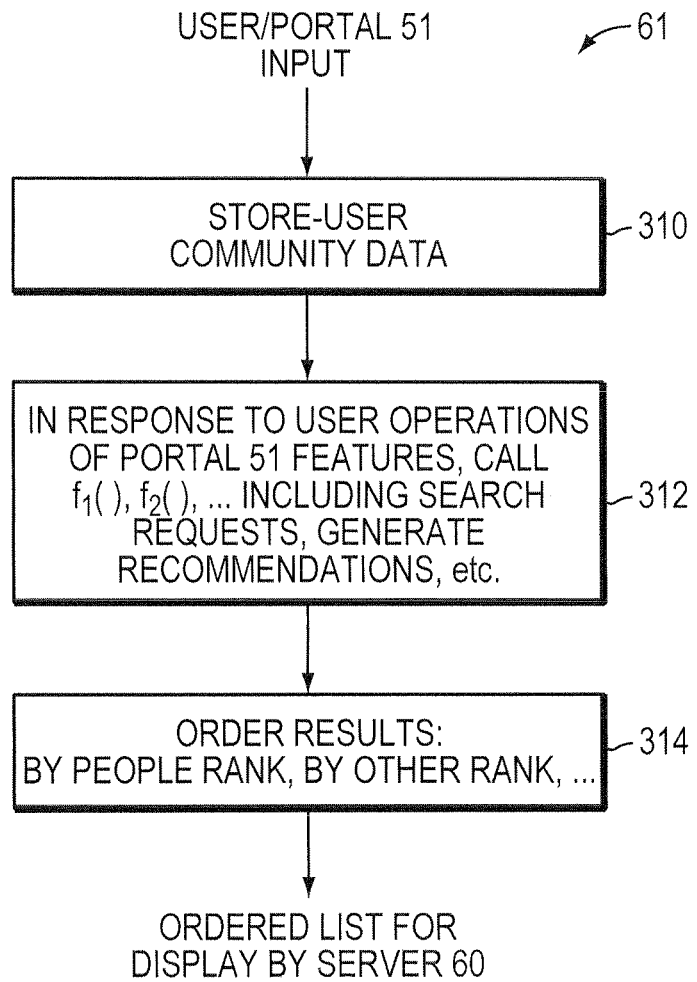
FIG. 3 is a flow diagram of a people ranking process embodying the present invention.

Consider the connection graph of four nodes 11, 12, 13, 14, shown in FIG. 2. Each of the nodes 11, 12, 13, 14 in this example represents a person (user) within a social network (computer network community such as at 51 in FIG. 1). Node 11 issues connections requests 21, 22, 23 to nodes (connects with) 12, 13 and 14. Node 12 issues connection requests 24 to node 14. Node 13 issues connection request 25 to node 14. Node 14 issues connection requests 27, 29 to nodes 11 and 12, respectively.

From this graph, the E[u,v] matrix is determined as follows:

Node, $u$ = 11   0   1   1   1
Node, $u$ = 12   0   0   0   1
Node, $u$ = 13   0   0   0   1
Node, $u$ = 14   1   1   0   0

Next, compute the Nu vector as the count of outgoing connections (21, 22, 23 . . . , etc.) for each node 11, 12, 13, 14:

Node, $u$ = 11   0   1   1   3    Nu
Node, $u$ = 12   0   0   1   1
Node, $u$ = 13   0   0   1   1
Node, $u$ = 14   1   1   0   2

Next, normalize the E matrix by the Nu values and generate the L[u,v] matrix:

Node, $u$ = 11   0   .33   .33   .33
Node, $u$ = 12   0   0     0     1
Node, $u$ = 13   0   0     0     1
Node, $u$ = 14   .5  .5    0     0

Transposing this matrix provides:

$L[u, v]^T$   0    0   0   .5
              .33  0   0   .5
              .33  0   0   0
              .33  1   1   0

Now apply a power iteration with the matrix equation:

$$p_1 = L^T p_0$$

For initial values of p, the present invention chooses 1/N, where N is the total number of nodes 11, 12, 13, 14:

$p0$ = .25
      .25
      .25
      .25

Now compute the first iteration of p:

$p1$ = .25         0    0   0   .5
       .25    *    .33  0   0   .5
       .25         .33  0   0   0
       .25         .33  1   1   0

$p1$ = .125
       .208
       .0825
       .5825

Taking the absolute magnitude of p1, one has:

$$\|p_1\| = \sqrt{p_1^T p_1} = .1964$$
.3268
.1296
.9153

After one pass of the iterations, the PeopleRank for each of the for nodes 11, 12, 13, 14 is defined.

One can now keep iterating by using the value of p1 to compute p2, p3, etc. Iterating can continue until one reaches a convergence to values of p within some epsilon error or until one reaches a convergence of the relative rankings of the values for p.

In an embodiment of the invention, an output member i) is coupled to receive the determined rank from the ranking module and ii) generates an ordered list of user names ordered by determined rank of individuals. The ordered list, as well as the ranks of individual users, may be passed to entities external from the community (e.g., other communities).

Example applications of the above invention PeopleRank include search engine ordering a list of people names for display of search results, recommendation engine ordering a list of people names, and other portal operations ordering results lists. U.S. patent application Ser. Nos. 11/371,462; 11/451,995; and 11/593,864 (herein incorporated by reference) describe a network community portal 51 with such operations. The description below summarizes such a network community portal 51 employing the present invention People Rank.

Embodiments of the invention can determine absolute as well as relative user demand. For example, user demand (e.g., as determined by number of connection requests) can be weighted by user to yield a demand distribution for an individual user across other users.

It is understood that instead of requests for connection as in the above description of PeopleRank, requests to interact or otherwise have an association with (directly or indirectly) an individual user may be used to determine importance of or demand for the individual user being ranked. Demand for an individual user may be demonstrated by any or more of the following:

- number of actual connections made to the individual user;
- number of messages (e.g., email, text messages, and the like) sent to the individual user;
- number of messages (e.g., email, text messages, and the like) sent by the individual user and opened by other users;
- number of public comments on the individual user's profile;
- number of requests to view content authored by the individual user;
- number of comments made on the individual user's content;
- number of invitations sent to the individual user for any one or combination of: i) membership to the community, ii) membership to groups, and ii) events;
- number of chat or instant message requests made to the individual user;
- number of chat or instant message sessions engaged in by the individual user;
- number of videoconference requests made to the individual user;
- number of videoconference sessions engaged in by the individual user;
- number of calls attempted to the individual user;
- number of calls received by the individual user;
- community members following the individual user's activity within the network; and
- keywords common between any one or combination of a profile and content created by a user and any one or combination of the profiles and content of the individual user.

These factors (social activities and other factors) can all be incorporated in graph-theoretic terms as described above to recursively determine importance.

Community members may follow a user's activity as described above by including the user on feeds (which indicate recent activities of the user) or by requesting offsite notification of the user's activities via email, text messages, or similar messages. These forms of following a user's activity may result in different ranks for the user in different topic areas.

Invitations sent to a user for membership may affect the user's importance both before and after the user joins the network. A user who is already a member of a community may continue to receive requests to join the same community, which are converted to connection requests.

Turning to FIG. 1A, illustrated is a computer network or similar digital processing environment in which embodiments of the present invention (People Rank) may be implemented in a search engine, recommendation engine, social network, and so forth.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

FIG. 1B is a diagram of the internal structure of a computer (e.g., client processor/device 50 or server computers 60) in the computer system of FIG. 1A. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 1A). Memory 90 provides volatile storage for computer software instructions 92 and data 94 used to implement an embodiment of the present invention (e.g., People Rank code 63 detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like. Further it is understood that the present invention may be implemented in a variety of computer architectures. The computer network of FIGS. 1A and 1B are for purposes of illustration and not limitation of the present invention.

In particular, server(s) 60 provides and maintains a portal 51 that defines a community of users. The portal 51 enables community members to organize groups, communicate with one another (on an individual or group basis), network with one another (including defining connections between people), publish authored works (content), and the like. Those who create authored contents are referred to as authors or author-users; and those who view such contents are reader-users. Community members or community users are those global computer network users who interact with portal 51 (or network community site 51).

The subject system 61 enables members to build a social network. A relation module is coupled with the subject system to measure the extent and strength of the connections between users. The term "degrees of separation" is used to describe the number of users connecting a given user to a subject target person. For any given user, the subject system 61 shows the "shortest path" linking that user to a subject target person. In cases in which there are more than three degrees of separation between two users, the system indicates that the users are not closely connected. In measuring the strength of the connection between two users, the relation module weighs a combination of factors such as the number of times the users have communicated through email or instant messaging, and the time elapsed from when an email is received to when it is opened and replied to between the users.

The relation module allows an arbitrary group to define relations among a subset of users. The groups may be public or personal. Personal groups are designed such that the users are members of another user's personal contact and hence have no knowledge of their membership in the group. Members of public groups, however, need to confirm their membership before they can join the group. Public group members are allowed to publish their authored works into a central location for the entire group to access. Members are allowed to comment on the authored works and are informed when a new publication occurs or someone posts a comment on an article that is part of the group. Membership of shared groups is generally viewable by all group members.

The creator of a group may disable the ability for group members to publish to the group in order to control group content. In such cases, the creator of the group may have approval authority to approve authored works submitted to the group before such authored works are published for viewing by group members. The creator of the group may also make authored works available for non-member viewing. Members of the group may invite non-members to join the group and the group creator may set preferences allowing users who are non-members to apply for group membership. Groups are searchable by their names, tags or keywords, authored works of the group, number of members, publishing rate of the group, and commenting rate.

Reader-expressed rankings are employed to determine the quality or popularity of an authored work. The change in the ranking of an authored work may be based on quality rating of the author, popularity rating of the author, and/or popularity rating multiplied by quality rating. Rating of an authored work is done across the system contents within specific tags or taxonomical categories. The author-user and/or his work is rated for popularity based on the number of times the work is forwarded or bookmarked, on the popularity rating from users, on individual user traffic, on relative traffic with respect to other authored work similarly categorized, and/or on relative traffic against other authored work over the entire network community site (subject system 61).

In an embodiment of the invention, a member's rank is used in compensating that member for community participation or publishing. For example, highly important or popular people may be compensated more than other individuals for creating content.

In another embodiment, content appearing in search results is sorted using the PeopleRank of authors of the content as one factor (other factors may be used as well). In this way, spam is not given equal weight as high-quality content in search results, since spammers are likely to have low PeopleRanks. In another embodiment, the results of searching for members of a community are sorted using PeopleRank as one factor. Users may also opt not to see, in search results, users below a certain rank, and members' ranks may be visible in another embodiment as either a number or within a tier demonstrating status (e.g., new member, intermediate, expert). These factors make it less likely that spammers or other objectionable people will have their profiles and/or content displayed in response to searches.

Authored works are given a system-wide ranking based on a combination of: rating distinguishing between serious and humorous subject matter, rating on writing quality, rating on presentation, rating distinguishing between conservative and liberal points of view, rating for suitability for different audiences and age groups, rating for compliance with one or more standards, and rating to indicate how accurately the authored work was categorized or tagged.

Reader-users further organize the authored works by suggesting alternative taxonomical categorizations and/or alternative keywords. The subject system also organizes or ranks authors by the number of times an author's works are viewed by reader-users, by quality and/or popularity ratings, and by comments by others on the author. Such author ranking may be across a certain time period, by tag, or across all tags.

The subject system 61 can also generate a profile of individual network community users based on measuring keywords and/or word combinations commonly used by author-users or read by reader-users. Based on this profile, the system may generate a list of suggested readings of authored works viewed by one or more users having a similar profile.

In an embodiment of the invention, negative behavior is identified using a user-recursive factor. In this context, negative behavior refers to prohibited or discouraged activities including spamming, harassing, violating terms of service, publishing pornography, using automated 'bots' to increase page views, creating multiple inter-linked profiles, and attempting to defraud or abuse the system in any other way. In an embodiment, a technique called "cookie proxying" uses cookies to identify a single user who has multiple profiles Cookies are parcels of text sent by a server to a client such as a web browser and then sent by the client back to the server on subsequent accesses of the server. Cookie proxying uses cookies to track browsing activities and determine when a single computer is used in multiple logon sessions with different profiles.

Negative behavior may be identified based on geography, e.g., individuals from a certain country or IP address range. In some embodiments, the PeopleRank of an "abuser" (individual who conducts fraudulent activities) is decreased. In other embodiments, a separate "Abuser" score is maintained. In an embodiment, activities of abusers and individuals connected to abusers may be monitored via a "watch list." This watch list is maintained with the names of those with PeopleRanks below a certain threshold (or abuser scores of a certain level). In other embodiments, PeopleRank is provided as an input to a fraud detection system. PeopleRanks of individuals in a given online social community (or computer network community) may be used by fraud detection systems monitoring that community, or they may be sent to fraud detection systems of other communities.

A user's PeopleRank is decreased in an embodiment of the invention when the user: i) invites others to connect and those invitations are declined or ignored; ii) is disconnected by another user; or iii) attempts to comment on another user's profile and is refused or has such comments deleted. People with low PeopleRanks or who are on the watch list may have their behavior observed and their privileges or technical functionality limited by system administrators. Conversely, people with a high PeopleRank or in a high PeopleRank status tier may earn additional privileges or technical functionality.

In an embodiment, new members to a social network are assigned a ranking upon sign-up based on the rank of the person or people inviting them. In another embodiment, new members who register (join a community) without being invited are assigned a different initial rank than those who were invited to join. In this way, new members are presumed to have a certain level of importance upon entrance to the community.

In an embodiment of the invention, an "engagement campaign" is used to encourage members of an active community to act as conscious advocates for a product or activity. In an engagement campaign, selected individuals: i) are invited to try a product; ii) receive an invitation to a product; iii) receive a sample or preview of a product; or iv) receive preferred status or pricing for a product. In this context, "product" may refer to a product, service, or event. User rank is used to select such individuals based on any one or more of the following: i) areas of expertise; ii) areas of interest; and iii) profile characteristics.

These selected individuals will typically try the product or event and comment on their experiences, and their comments may encourage individuals connected to the select few to similarly try the product or event. In this way, a large customer base may be tapped by first targeting an influential (high people rank) group. Engagement campaigns represent a new source of monetization for social networks.

In an embodiment of the invention, users recommend content or Internet pages to their friends and family, and the recommendations are collected and organized for search results or navigation using PeopleRank of the recommenders as a factor. Another embodiment identifies subject matter experts based on at least one of PeopleRank and interest areas.

Experts identified in this way may be solicited to create content, comment on proposals or concepts, participate in discussions, or review publications. Experts may also be selected based on location (geography).

Once experts have been identified, an embodiment of the invention tracks their browsing activities to improve searching. Copies of pages or content that an expert has browsed to are stored in a search database. PeopleRank of that expert is associated with or otherwise effectively coupled to the page/content copy, and the copy is prioritized or otherwise ordered in the database according to the associated PeopleRank. An embodiment includes the search database of web content ranked (prioritized or ordered) by one or more of the following factors: relevance, PeopleRank, time (of content creation). Using the browsing history of experts in this way results in better search results (i.e., more relevant content) and faster discovery of online information. An embodiment determines popular topics based on the PeopleRank of individuals browsing the topics. Then, popular content areas are identified within each topic.

Alternatively, an embodiment uses PeopleRank to create a ranked community of users in a computer network as described previously. Next the embodiment observes (tracks and monitors) those users browsing content/pages on various global computer network sites (which may or may not be sites that are within the user community computer network). The embodiment collects copies of the pages/content so browsed and stores the collected copies in a database. The database system orders the importance of those pages/content as a function of at least PeopleRank of the browsing user (that was monitored and caused the page/content to be collected into the database). An improved search database (including content everywhere in the global computer network) results.

In an embodiment of the invention, PeopleRank is provided as an input to an advertising targeting engine. Typically, an advertising targeting engine establishes profiles on a per-advertisement basis. The engine matches as many users as possible to a particular advertisement profile in order to determine display distribution (target audience) or ripeness (favorable time for distribution). In an embodiment of the present invention, advertisements are selectively displayed to a given user based on any one or combination of the following of the user: i) PeopleRank, ii) profile, iii) interests, and iv) geography (location). Targeted advertisements may be displayed to a user on any site (e.g., websites on the Internet) or on a telecommunications device (e.g., a computer, PDA, and the like) capable of browsing.

In an embodiment, advertisements are bid for and bought based on the PeopleRank distribution of the intended audience. For example, advertisements are sent only to individuals above a certain PeopleRank or in a particular PeopleRank quartile, decile, or other distribution category.

While this invention has been particularly shown and described with references to example embodiments thereof, it will be understood by those skilled in the art that various changes in form and details may be made therein without departing from the scope of the invention encompassed by the appended claims.

What is claimed is:

1. A method for distributing digital content comprising:
in a hardware processor:
storing in a database of an Internet-based social network a plurality of user profiles, different ones of the stored user profiles representing different users in the Internet-based social network and each stored user profile including indications of rank in the Internet-based social network of the respective user represented by the profile;

accessing a search database storing digital content viewed by the users of the Internet-based social network, the digital content being from a plurality of global computer network sites;

identifying an importance of an individual user as a plurality of functions of user demand of the individual user;

determining at least one relative rank of the individual user based on the identified importance, said determining including: (i) representing the social network as an interconnected network graph having nodes and directional connection lines between the nodes, each node being a respective person and each directional connection line being a connection from a person requesting the connection to a person being connected to, and (ii) modeling the connections between people represented in the interconnected network graph as a mathematical edge-weighted directed graph, wherein the mathematical edge-weighted directed graph mathematically takes into account the entire interconnected network graph at once and derives the importance of the individual user as the plurality of functions of user demand recursively for the entire interconnected network graph, such that the at least one relative rank of the individual user is determined after one pass of iterations by determining a product of a first matrix and a second matrix, the first matrix being based on and representing connections between nodes of the mathematical edge-weighted directed graph and the second matrix being based on and representing a number of nodes in the graph so as to account for the entire interconnected network graph;

updating in the respective user profile, the indications of the at least one determined relative rank of the individual user, said user profile stored in the database of user profiles of the social network;

prioritizing at least some of the digital content in the search database as a function of at least the determined relative rank stored in the user profiles of the respective users that viewed the digital content and distributing the content based on the prioritization, wherein said hardware processor is configured to perform said storing, identifying, determining, updating, prioritizing, and distributing.

2. A method as claimed in claim 1 wherein the plurality of functions of user demand includes any one or more of:
number of requests to be connected to the individual user;
number of actual connections made to the individual user;
number of messages sent to the individual user;
number of messages sent by the individual user and opened by other users;
number of public comments on a profile of the individual user's;
number of requests to view content authored by the individual user;
number of comments on the individual user's content;
number of invitations sent to the individual user for any one or more of: i) membership to the community, ii) membership to groups, and ii) events;
number of chat requests made to the individual user;
number of chat sessions engaged in by the individual user;
number of videoconference requests made to the individual user;
number of videoconference sessions engaged in by the individual user;
number of calls attempted to the individual user;
number of calls received by the individual user;
community members following activities of the individual user activity within the network; and
keywords common between any one or combination of a profile and content created by a user and any one or combination of a profile and content of the individual user.

3. A method as claimed in claim 2 wherein the community members following may be topic specific, resulting in different ranks for each user for different topical areas.

4. A method as claimed in claim 1 wherein plurality of functions of user demand of the individual user is normalized according to a total number of requests to be connected to any of the global computer network users per global computer network user.

5. A method as claimed in claim 1 wherein determining the at least one rank includes recursively using ranks of people connecting to the individual user, wherein each person has a respective rank based on his identified importance, his identified importance being a function of demand for him.

6. A method as claimed in claim 1 further comprising, in the database, decreasing the at least one rank of the individual user if the individual user engages in behavior that is negative within the community.

7. A method as claimed in claim 6 further comprising establishing a watch list of individuals whose activities may be limited by system administrators.

8. A method as claimed in claim 1 further comprising decreasing the at least one rank of the individual user when connection requests sent by the individual user to other people are declined or ignored.

9. A method as claimed in claim 1 further comprising sorting results of searching for members of the community, where the sorting includes the at least one ranks of the members as a factor.

10. A method as claimed in claim 1 further comprising sorting search results for content, where the sorting includes the at least one ranks of authors of the content as a factor.

11. A method as claimed in claim 1 further comprising:
for each content, collecting information of users that browse the content including collecting rankings of said users; and
organizing search results for content using a function of ranks of users browsing the content.

12. A method as claimed in claim 1 further comprising:
collecting user recommendations of at least one of content and a global computer network page; and
organizing the recommendations for at least one of search results and navigation using a function of ranks of users that made the recommendations.

13. A method as claimed in claim 1 wherein members may opt not to see an indication of a user below a certain rank.

14. A method as claimed in claim 1 further comprising providing the at least one rank of the individual user as an input into fraud detection algorithms.

15. A method as claimed in claim 1 wherein the at least one rank is visible as one or more of i) a number; and ii) a tier level demonstrating status.

16. A method as claimed in claim 1 wherein the at least one rank is used in compensating the individual user for participation or publishing in the community.

17. A method as claimed in claim 1 wherein members have different privileges or technical functionality based on their rank.

18. A method as claimed in claim 1 further comprising assigning a new member to the community, who is invited to the community by another member, an initial rank upon sign-up based on the at least one rank of the other member who invited the new member.

19. A method as claimed in claim 18 in which the initial rank is assigned differently to new members to the community who register without being invited than to new members who are invited to join.

20. A method as claimed in claim 1 further comprising providing the at least one rank of the individual user to an entity external from the community.

21. A method as claimed in claim 20 further comprising providing the at least one rank to an advertising targeting engine for the purpose of targeting advertising to people using one or more of a website and an identifiable telecommunications device for browsing.

22. A method as claimed in claim 1 wherein user rank in any one or more of areas of expertise, areas of interest, and profile characteristics is used to identify a group of people to invite to do any one or more of the following: try a product; receive an invitation; receive a sample; receive a preview; and receive preferred status for a product.

23. A method as claimed in claim 21 further comprising determining advertisements that will be displayed to a user based on any one or more of user rank, profile characteristics, areas of interest, and geography.

24. A method as claimed in claim 21 further comprising pricing advertisements based on the rank distribution of people who will receive the advertisements.

25. A method as claimed in claim 1 further comprising identifying experts to do any one or more of creating content, commenting on proposals, participating in discussion, and reviewing publications; wherein the identifying is based on any one or more of user rank, profile characteristics, and areas of interest.

26. A method as claimed in claim 25 wherein the identifying is based on geography to identify experts in a specific location.

27. A computer system for distributing digital content comprising:
 a database of an Internet-based social network containing a plurality of user profiles, different ones of the stored user profiles representing different users in the Internet-based social network, each stored user profile including indications of rank in the Internet-based social network of the respective user represented by the profile;
 a search database containing digital content viewed by the users of the Internet-based social network, the digital content being from a plurality of global computer network sites;
 a processor configured to identify an importance of the individual user as a plurality of functions of user demand;
 the processor further configured to execute a computer program comprising instructions for execution by a processor, from a non-transitory computer readable storage medium, the computer program adapted for:
 determining at least one relative rank of the individual user based on the identified importance, said determining including: (i) representing the social network as an interconnected network graph having nodes and directional connection lines between the nodes, each node being a respective person and each directional connection line being a connection from a person requesting the connection to a person being connected to, and (ii) modeling the connections between people represented in the interconnected network graph as a mathematical edge-weighted directed graph, wherein the mathematical edge-weighted directed graph mathematically takes into account the entire interconnected network graph at once and derives the importance of the individual user as the plurality of functions of user demand recursively for the entire interconnected network graph, such that the at least one relative rank of the individual user is determined after one pass of iterations by determining a product of a first matrix and a second matrix, the first matrix being based on and representing connections between nodes of the mathematical edge-weighted directed graph and the second matrix being based on and representing a number of nodes in the graph so as to account for the entire interconnected network graph; and
 updating in the user profile, the indications of the at least one determined relative rank of the individual user, said user profile corresponding to the individual user and being stored in the database of user profiles of the social network;
 prioritizing at least some of the digital content in the search database as a function of at least the determined relative rank stored in the user profiles of the respective users that viewed the digital content and
 distributing the digital content at least based on the prioritization.

28. A computer system as claimed in claim 27 wherein the plurality of functions of user demand includes any one or more of:
 number of requests to be connected to the individual user;
 number of actual connections made to the individual user;
 number of messages sent to the individual user;
 number of messages sent by the individual user and opened by other users;
 number of public comments on a profile of the individual user's;
 number of requests to view content authored by the individual user;
 number of comments on the individual user's content;
 number of invitations sent to the individual user for any one or more of: i) membership to the community, ii) membership to groups, and ii) events;
 number of chat requests made to the individual user;
 number of chat sessions engaged in by the individual user;
 number of videoconference requests made to the individual user;
 number of videoconference sessions engaged in by the individual user;
 number of calls attempted to the individual user;
 number of calls received by the individual user;
 community members following activities of the individual user activity within the network; and
 keywords common between any one or combination of a profile and content created by a user and any one or combination of a profile and content of the individual user.

29. A computer system as claimed in claim 28 wherein the community members following may be topic specific, resulting in different ranks for each user for different topical areas.

30. A computer system as claimed in claim 27 wherein the plurality of functions of user demand is normalized according to a total number of requests to be connected to any of the global computer network users per global computer network user.

31. A computer system as claimed in claim 27 wherein determining the at least one rank includes recursively using ranks of people connecting to the individual user, wherein each person has a respective rank based on his identified importance, his identified importance being a function of demand for him.

32. A computer system as claimed in claim 27 wherein the processor is further configured to decrease, in the database, the at least one rank of the individual user if the individual user engages in behavior that is negative within the community.

33. A computer system as claimed in claim 32 further comprising a watch list of individuals whose activities may be limited by system administrators.

34. A computer system as claimed in claim 27 wherein the processor is further configured to decrease the at least one rank of the individual user when connection requests sent by the individual user to other people are declined or ignored.

35. A computer system as claimed in claim 27 wherein the processor is further configured to sort results of searching for members of the community, where the sorting includes the ranks of the members as a factor.

36. A computer system as claimed in claim 27 wherein the processor is further configured to sort search results for content, where the sorting includes the ranks of authors of the content as a factor.

37. A computer system as claimed in claim 27 wherein the processor is further configured to:
    collect information of users who are browsing content, including collecting ranks of said users; and
    organize search results for content using a function of ranks of users browsing the content.

38. A computer system as claimed in claim 27 wherein members may opt not to see an indication of a user below a certain rank.

39. A computer system as claimed in claim 27 wherein the processor is further configured to provide the at least one rank of the individual user as an input into fraud detection system.

40. A computer system as claimed in claim 27 wherein the at least one rank is visible as one or more of i) a number; and ii) a tier level demonstrating status.

41. A computer system as claimed in claim 27 wherein the at least one rank is used in compensating the individual user for participation or publishing in the community.

42. A computer system as claimed in claim 27 wherein members have different privileges or technical functionality based on their rank.

43. A computer system as claimed in claim 27 wherein the processor is further configured to assign a new member to the community, who is invited to the community by another member, an initial rank upon sign-up based on the at least one rank of the other member who invited the new member.

44. A computer system as claimed in claim 43 in which the initial rank is assigned differently to new members to the community who register without being invited than to new members who are invited to join.

45. A computer system as claimed in claim 27 wherein the processor is further configured to provide the at least one rank of the individual user to an entity external from the community.

46. A computer system as claimed in claim 27 wherein user rank in any one or more of areas of expertise, areas of interest, and profile characteristics is used to identify a group of people to invite to do any one or more of the following: try a product; receive an invitation; receive a sample; receive a preview; and receive preferred status for a product.

47. A computer system as claimed in claim 27 wherein the processor is further configured to identify experts to do any one or more of creating content, commenting on proposals, participating in discussion, and reviewing publications;
    wherein the identifying is based on any one or more of user rank, profile characteristics, and areas of interest.

48. A computer system as claimed in claim 47 wherein the identifying is based on geography to identify experts in a specific location.

* * * * *